United States Patent [19]

Shirai et al.

[11] Patent Number: 5,535,046
[45] Date of Patent: Jul. 9, 1996

[54] FARADAY ROTATOR

[75] Inventors: Kazushi Shirai; Norio Takeda, both of Tokyo, Japan

[73] Assignee: Mitsubishi Gas Chemical Company, Inc., Tokyo, Japan

[21] Appl. No.: 299,344

[22] Filed: Sep. 1, 1994

[30] Foreign Application Priority Data

Oct. 5, 1993 [JP] Japan ................... 5-249523

[51] Int. Cl.⁶ .................................. G02F 1/09
[52] U.S. Cl. .................. 359/281; 359/280; 359/282; 359/484; 252/584
[58] Field of Search ............... 359/280, 281, 359/282, 283, 324; 252/584; 372/26, 33, 37

[56] References Cited

U.S. PATENT DOCUMENTS

| | | | |
|---|---|---|---|
| 3,904,273 | 9/1975 | Simmons et al. | 359/283 |
| 4,581,579 | 4/1986 | Nagatsuma et al. | 359/324 |
| 4,686,678 | 8/1987 | Ohta et al. | 372/33 |
| 4,728,178 | 3/1988 | Gualtieri et al. | 359/282 |
| 4,856,878 | 8/1989 | Wilson et al. | 359/283 |
| 4,932,760 | 6/1990 | Arii et al. | 359/281 |
| 4,974,944 | 4/1990 | Chang . | |
| 4,981,341 | 1/1991 | Brandle, Jr. et al. | 359/281 |
| 5,087,984 | 2/1992 | Heiney et al. | 359/282 |
| 5,204,771 | 4/1993 | Koga | 359/281 |
| 5,277,845 | 1/1994 | Ryuo et al. | 252/584 |
| 5,281,912 | 1/1994 | Togawa | 359/280 |
| 5,381,261 | 1/1995 | Hirai et al. | 359/282 |

FOREIGN PATENT DOCUMENTS 0352002  1/1990  European Pat. Off. .
0413566  2/1991  European Pat. Off. .

OTHER PUBLICATIONS

*Patent Abstracts of Japan*, vol. 10, No. 169 (P–468), Jun. 14, 1986.

Primary Examiner—Loha Ben
Attorney, Agent, or Firm—Burns, Doane, Swecker & Mathis

[57] ABSTRACT

A Faraday rotator in which a portion of a rare-earth iron garnet single crystal film is exposed to a localized magnetic field to control hysteresis. In one embodiment, the field is applied by a permanent magnet positioned on a part of the film. As a result, it is possible to fabricate Faraday effect optical switches and magneto-optical sensors using rare-earth iron garnet films having small saturated magnetic field intensities.

6 Claims, 6 Drawing Sheets

FARADAY ROTATOR

FIELD OF INVENTION

The present invention relates to means to make use of a rare-earth iron garnet single-crystal film with large magnetic hysteresis as a Faraday rotator utilized for magneto-optical sensors and optical switches.

More particularly, the invention relates to means to make it possible to apply even a rare-earth iron garnet single-crystal film with large magnetic hysteresis to a Faraday rotator, by erasing the magnetic hysteresis which is an obstacle to the use of the film as a Faraday rotator of magneto-optical sensors and optical switches.

BACKGROUND OF THE INVENTION

In recent years, the optical switches or the devices which are called an optical current sensor and an optical rotation sensor, utilizing a rare-earth iron garnet single-crystal film with large Faraday effect, have been put to practical use in succession. Further, the exploitation of rare-earth iron garnet single-crystal films in accordance with those uses has been carried out actively.

The Faraday effect is a kind of magneto-optical effect and a rotation phenomenon of a polarization plane of a light ray which passes through materials having Faraday effect, i.e., Faraday elements (Faraday rotator) such as a rare-earth iron garnet single-crystal film. And, the rotation angle in the polarization plane is proportional to the magnetization intensity, as shown in FIG. 1.

In FIG. 1, the angle of the Faraday rotation is zero, i.e., which is positioned at the origin(o), when no external magnetic fields are applied.

In accordance with successive increasing in the intensity of the magnetic field, the absolute value of the Faraday rotation angle ($\theta_F$ or $-\theta_F$, clockwise is plus and counter-clockwise is minus normally) proceeds via the point a or the point d, and increases gradually (the route o-a-b, or the route o-d-e). The Faraday rotation angle reaches the saturated value (the saturated magnetic field: the point b or e), when the external magnetic field intensity gets to an intensity value (Hs). Even if the external magnetic field intensity increases further, the Faraday rotation angle makes no change and only transits from b to o or from e to f, because the Faraday rotation angle has reached to the saturated value.

The Faraday rotation angle traces the reverse route, i.e., the route o-b-a-o or f-e-d-o, while the external magnetic field intensity is reduced gradually, and returns back to the origin o when the external magnetic field finally comes to have no effect. As mentioned above, devices which utilize magnetic field dependency on the polarization plane rotation angle include optical switches or magnetic field sensors.

The optical switches can be acted by changing over the magnetic fields having larger intensity than the saturation point b or e in FIG. 1, wherein the magnetic field is generated by a magnetic field generating device, and the detection of the magnetic field by using an optical current sensor is carried out by knowing the difference in the Faraday rotation angles within the linear zone between the origin o and the saturation point b according to the light ray intensity. And, the detecting of the magnetic field intensity by using a magneto-optical sensor for a rotation sensor is carried out by knowing the difference in the Faraday rotation angles within the origin o and the saturation point b or c according to the light intensity.

A configuration of an optical switch utilizing a rare-earth iron garnet single-crystal film is illustrated in FIG. 2, wherein numeral 1 designates a polarizer made of rutile or the like; numeral 2, a Faraday rotator composed of a rare-earth iron garnet single-crystal film; numeral 3, a polarized light separator made of rutile or the like. Numeral 4 denotes a magnetic field generating device having enough capacity to saturate the Faraday rotator magnetically, i.e., composed of electromagnets, coils and etc. to generate the magnetic field having larger intensity than the saturated magnetic field.

In FIG. 2, a light ray passing through the polarizer 1 is turned into a linearly polarized light and it enters into the Faraday rotator. Thereupon, the linearly polarized wave plane of the input light is rotated. Whether the rotation of the linearly polarized wave plane results in clockwise (plus) or counter-clockwise (minus) direction depends on the direction of the magnetic field applied to the Faraday rotator. When the rotation direction of the linearly polarized wave plane is changed over, the path the light of passing through the polarized light separator 3 is switched. That is, by switching the direction of the applied magnetic field, the output light path is switched over, i.e., the switching operation is enabled.

In this configuration, if the saturated intensity of the magnetic field in the Faraday rotator is considerably large, in order to generate the magnetic field enough for saturating the Faraday rotator magnetically, a magnetic field generating device of large size is necessary, which needs considerable electric power. Further, it causes the problem of heat generation by way of the coils by the electric current. Therefore, in an optical switch based on Faraday effect, the saturated magnetic field intensity of a rare-earth iron garnet single-crystal film is required to minimize for the sake of saying electric power and making small in size with regard to the magnetic field generating device.

An optical current sensor is configurated normally as shown in FIG. 3, i.e., numeral 5 denotes a polarizer comprising of rutile and the like; numeral 6, a Faraday rotator comprising of a rare-earth iron garnet single-crystal film and the like; numeral 7, an analyzer comprising of rutile and the like. In FIG. 3, the light passed through the polarizer 5 has the character of a linearly polarized light, wherein the linearly polarized wave plane is rotated. The light having passed through the Faraday rotator passes through the analyzer, wherein the light intensity changed in response to the Faraday rotation angle. Normally, the rotation of the linearly polarized wave plane changes almost linearly within the magnetic field less than saturation (as shown in FIG. 1) in response to the external magnetic field applied to the Faraday rotator. Therefore, by measuring the light intensity after the light passes the analyzer, the intensity of the external magnetic field applied to the Faraday rotator can be known.

In an optical current sensor, a minute change of electric current running in cables must be detected precisely. In order to detect a minute change of the electric current, i. e., a minute change of the magnetic field generated by the current, the inclination of the straight line in FIG. 1 should be larger, which makes it desirable to reduce the intensity of the saturated magnetic field of a rare-earth iron garnet single-crystal film utilized in a Faraday rotator so that the Faraday rotation angle per magnetic intensity can be larger.

In a rotating speed meter utilizing a magneto-optical sensor, i.e., a rotating speed sensor based on an optical signal, a permanent magnet is provided on a rotary equipment (as shown in "Applied Optics", in 1989, Vol.28 No.11, page 1992), wherein within the scope of the magnetic field produced by the permanent magnet, a magneto-optical sensor comprising of a rare-earth iron garnet single-crystal film is arranged, whereof, according to the rotation of the rotary equipment, the magneto-optical sensor and the permanent magnet come close to and move apart from each other repeatedly, and a difference, in the magnetic field intensity applied to the Faraday rotator, is caused between the state of coming close and the state of getting apart. That is, according to the turn of the permanent magnet, the Faraday rotation angle is changed, which causes a change in the light intensity passing through the analyzer. Therefore, the number of the rotation or the rotating speed can be known by detecting the change of the light intensity.

In this case, the distance between the permanent magnet and the magnetic-optical sensor head gets longer, the magnet field intensity turns in lower level. Hence, for the sake of achieving higher level sensitivity and accuracy in regard to a rotating speed meter utilized Faraday effect, it is necessary to compensate the lower level magnetic field by using a more powerful permanent magnet and/or to make the distance, between the permanent magnet and the magneto-optical sensor head, shorter, in conjunction with selecting a magneto-optical sensor head sufficiently operative within the lower level magnetic field.

And, it is not economical to use a more powerful permanent magnet, which, moreover, puts a restriction on an installing location occasionally because of a large size permanent magnet, wherein the distance between the permanent magnet and the magneto-optical sensor head gets longer to cause an unfavorable result or to achieve no improvement substantially. Hence, it is required to provide a rare-earth iron garnet single-crystal film which is saturated magnetically by a low level magnetic field.

As mentioned above, in an optical switch or a magneto-optical sensor, it is much desired to provide a rare-earth iron garnet single-crystal film which can be saturated magnetically by a magnetic field at a level as low as possible.

SUMMARY OF THE INVENTION

A rare-earth iron garnet single-crystal film denoted by the chemical structural formula $R_3(FeA)_5O_{12}$ (wherein, R represents yttrium Y, bismuth Bi or a rare-earth element, and A represents aluminum Al, gallium Ga or the like) can be produced comparatively easily by a liquid-phase epitaxial method (LPE). Especially, it is known that a bismuth substituted rare-earth iron garnet single crystal in which a part of rare-earth compounds is substituted by bismuth proves a considerably large Faraday effect.

As a rare-earth iron garnet single crystal utilized for an optical switch and an optical current sensor is preferable to have a saturated magnetic field intensity in the lowest level as possible in consideration of their sensitivity and production cost; normally, it is widely carried out that the iron is substituted by such elements as aluminum Al or gallium Ga. For example, $(GdBi)_3(FeGaAl)_5O_{12}$, $(HoTbBi)_3(FeGaAl)_5O_{12}$ and the like is reported thereof (refer to Japanese Patent Application Preliminary Publication No. 61-20926 and Japanese Patent Application No. HEISEI 5-55621).

However, in regard to a rare-earth iron garnet single-crystal film, while the constitution ratio of Al and Ga to Fe is changed to reduce the saturated magnetic field intensity, it causes the critical problem, in practical use, that the magnetic hysteresis increases gradually.

In the following, a detailed explanation is given in regard to magnetic hysteresis. In regard to a rare-earth iron garnet single crystal with comparatively large saturated magnetic field intensity, for an example, $(HoTbBi)_3Fe_5O_{12}$, magnetization characteristics of a Faraday rotator in response to an external magnetic field, that is, the relation between the Faraday rotation angle and the external magnetic field intensity is as shown FIG. 1. However, a rare-earth iron garnet single crystal with small saturated magnetic field intensity, for example, $(GdBi)_3(FeAlGa)_5O_{12}$ describes such a hysteresis loop as the route o-a-b-c-b-b'-a-o shown in FIG. 4. That is, the route, when the external magnetic field intensity is increasing (the route o-a-b-c), is different from the route whereof the intensity is decreasing (the route c-b-b'-a-o).

In FIG. 4, the magnetic field intensity at the points b and e is named saturated magnetic field intensity Hs, the magnetic field intensity at the points b' and e' brought about by the hysteresis of the magnetization characteristics is named nucleation magnetic field intensity Hn, and the difference (Hs–Hn) between the saturated magnetic intensity Hs and the nucleation magnetic field intensity Hn is defined as a hysteresis value. Hereof, in order to make the explanation simple and easy, the saturated magnetic field intensity Hs at the point b is named Hs1, the nucleation magnetic field intensity Hn at the point b' is named Hn1, the saturated magnetic field intensity Hs at the point e being named Hs2, the nucleation magnetic field intensity Hn at the point e' being named Hn2.

When the hysteresis of the rare-earth iron garnet single-crystal film gets larger and the nucleation magnetic field intensity Hn is coming close to the origin o, as shown in FIG. 4, the once saturated magnetization state is mentioned till the external magnetic field almost reaches zero. Therefore, with respect to an optical rotating sensor comprising of a Faraday rotator with larger hysteresis, in order to detect the magnetic field intensity, the magnetic field intensity surrounding the magneto-optical sensor must be made almost zero. However, the rotating sensor is arranged inside of a machinery equipment usually, and, further, the material of the machinery equipment has a magnetic field only by a just small value. Hence, it is difficult to use the magneto-optical sensor of which the surrounding magnetic field intensity being almost zero. Further, with respect to an optical current sensor, the measuring range of the magnetic field intensity is restricted within the range less than Hn.

Moreover, when the hysteresis of the rare-earth iron garnet single-crystal film gets larger further, the nucleation magnetic field intensity Hn1, in some cases, enters into a minus side (FIG. 5), and the nucleation magnetic field intensity Hn1, other cases, gets larger than the saturated magnetic field intensity Hs2, wherein a rectangular hysteresis curve being drawn (FIG. 6), after saturated once, the rectangular hysteresis loop being drawn only, the magnet field intensity necessary for saturated magnetization getting larger than the original magnetic field intensity of the rare-earth iron garnet single crystal.

Thus, the rare-earth iron garnet single-crystal film with large magnetic hysteresis, as the relation of being linear between the applied magnetic field and the Faraday rotating angle is not kept on, is naturally not proper at all as a Faraday rotator and is considerably difficult to use in an optical rotating sensor and an optical switch because of the large magnetic intensity necessary for saturated magnetization.

Generally, in a rare-earth iron garnet single-crystal film, when gallium or aluminum is substituted for iron, the saturated magnetic field intensity gets smaller, and the magnetic hysteresis increases larger in response to the reduction of the saturated magnetic field intensity. Therefore, the inventors of the present invention have studied intensively to exploit a rare-earth iron garnet single-crystal film with no magnetic hysteresis. As the result, $(YLaBi)_3(FeGa)_5O_{12}$ has been found out, wherein it has extremely small magnetic hysteresis in spite of its small saturated magnetization character, in comparison with a conventional rare-earth iron garnet single-crystal film. That is, it is a rare-earth iron garnet single-crystal film having the chemical structure of the general formula $Y_{3-x-y}La_xBi_yFe_{5-z}Ga_zO_{12}$ (wherein, x,y or z is a respective value:$0.1<x<0.4$, $1.0<y<1.9$, $1.0<z<1.6$) and it is grown on a non-magnetic garnet single crystal substrate by a liquid-phase epitaxial method.

However, even in said $(YLaBi)_3(FeGa)_5O_{12}$, the inclination:the magnetic hysteresis gets larger in response to the reducing of the saturated magnetic field intensity, was found. And, if the saturated magnetic field intensity is less than 150 Oe, the relation between the Faraday rotation angle and the external magnetic field intensity is like as shown in FIG. 5 or FIG. 6, which being considerably difficult in regard to its practical use.

As mentioned above in details, a rare-earth iron garnet single-crystal film with the lower saturated magnetic field intensity has large magnetic hysteresis, whereof, in the case of utilizing the film for a Faraday rotator in an optical switch and a magneto-optical sensor, there has been an obstruction or a restriction: such that a magnetic field generating device of large capacity to switch the magnetic field is desired; that the magnetic intensity of the permanent magnet arranged on a rotary equipment must be larger; that the measuring range of the magnetic field is very narrow; or the like.

The inventors of the present invention have studied intensively in regard to methods of utilizing a rare-earth iron garnet single-crystal film with a large magnetic hysteresis for a Faraday rotator in an optical switch and a magneto-optical sensor, whereby it has been found out that the magnetic hysteresis which has caused a problem in operation of an optical switch and a magneto-optical sensor, can be erased by constant magnetization of a part of the rare-earth iron garnet single-crystal film by a permanent magnet in the normal direction to the film surface, and even a rare-earth iron garnet single-crystal film with a large magnetic hysteresis can be utilized for a Faraday rotator in an optical switch and a magneto-optical sensor, which being an extremely useful knowledge, whereby the present invention having been completed with the addition of the further research/study.

That is, the present invention has been completed as an industrial production technique by the further experiment/study, which being based on the knowledge that by the constant magnetization of a part of the rare-earth iron garnet single-crystal film with a permanent magnet in the normal direction to the film surface; whereby the magnetization characteristics of the rare-earth iron garnet single crystal film for the external magnetic field being improved.

The magnetic hysteresis of the rare-earth iron garnet single-crystal film can be erased by constant magnetization of a part of the rare-earth iron garnet single-crystal film, the reason of which is not definite but is inferred in relation to the magnetic domain structure of the rare-earth iron garnet single-crystal film, as follows:

the magnetic domain structure of the rare-earth iron garnet shows a so-called multi-domain structure (state 1) as illustrated in FIG. 7, wherein in regard to the magnetization direction, the upward direction domain A and the downward direction domain B stand side by side alternately. And, for example, when a magnet field is applied in the same direction as domain A from outside (for a clearer explanation, it is defined that, in regard to the magnetization or the magnet field, the upward direction is plus; the downward direction is minus), the area of the domain A is increasing gradually (state 2); then, the minus magnetic domains are erased and the all magnetic domains get plus together (state 3). That is just a magnetically saturated state.

Then, when the external applied magnetic field intensity is reduced gradually, magnetic domains appear in the just less intensity state than the saturated magnetic field intensity. However, in the case of a rare-earth iron garnet single-crystal film with large magnetic hysteresis, the single domain structure (state 3 shown in FIG. 7) has been kept on even when the external applied magnetic intensity is reduced, which suggests a need of some acts for the transition from single domain structure to multi-domain structure, which bringing about the magnetic domain magnetized in the opposite direction to the single domain structure, i.e., in the minus magnetization direction.

And, on a part of a rare-earth iron garnet single-crystal film, a minus magnetized permanent magnet is positioned, whereby the surrounding domains of the permanent magnet hold minus magnetization constantly even though the almost all domains are plus magnetized by an external applied magnetic field (FIG. 8). Then, when the external magnetic field intensity is reduced, the following process is inferred; that is, as there are the domains having minus magnetization around the permanent magnet already, the domain B having minus magnetization spreads promptly to the all parts from there (FIG. 9). Therefore, by way of the portion except for the part on which the permanent magnet is provided in regard to the rare-earth iron garnet single crystal, the state of no hysteresis at all is achieved.

The completion of the present invention has enabled production of an optical switch which can further save energy and is smaller in size and a magneto-optical sensor detecting a minute magnetic field, wherein utilizing a rare-earth iron garnet single crystal.

In the application of the present invention, a kind of permanent magnet is not specified particularly and needs only enough magnetic power enough to saturate locally the rare-earth iron garnet single crystal, such as Alnico magnets, ferrite magnets, rare-earth permanent magnets or the like.

In the application of the present invention, the permanent magnet is not specified in size except having a magnetic power enough to saturate locally the rare-earth iron garnet single crystal.

In the application of the present invention, in regard to the arrangement of the permanent magnet, although being different according to the size of the rare-earth iron garnet single crystal or to the intensity and the size of a permanent magnet, the permanent magnet is only needed to be positioned by more than 0.3 mm apart from the light path.

In the application of the present invention, the magnetization direction of a permanent magnet must be opposite to the magnetic field applied from outside to the rare-earth iron garnet single crystal. When the magnetic field applied from outside to the rare-earth iron garnet single crystal is not of one direction but of both plus/minus directions, more than two magnets having different directed magnetization are only needed to be positioned.

In the application of the present invention, the Faraday rotator, i.e., the composition of the rare-earth iron garnet is not specified particularly, but it is preferably applied to a rare-earth iron garnet single crystal denoted by the general formula $R_3Fe_{5-z}A_zO_{12}$ (wherein, R represents at least one of the group: Bi, Y, La, Ce, Pr, Nd, Sin, Eu, Gd, Tb, Dy, Ho, Er, Tm, Yb, Lu, and A represents one of the group: Ga, Sc, Al, In) and more particularly to the ones with large magnetic hysteresis.

The present invention has been described concretely and in detail with the embodiments to show specific applications and their effects in the following. It should be noted that the following examples are for specifically describing the invention, but that it is not intended to limit the application of the present invention or the scope of the invention.

DESCRIPTION OF PREFERRED EMBODIMENTS

Embodiment 1

In a platinum crucible of volume 500 ml, the materials, 843 g of lead oxide (PbO, 4N); 978 g of bismuth oxide ($Bi_2O_3$, 4N); 128 g of ferric oxide ($Fe_2O_3$, 4N); 38 g of boron oxide ($B_2O_3$, 5N); 6.0 g of terbium oxide ($Tb_4O_7$, 3N); 7.0 g of holmium oxide ($Ho_2O_3$, 3N); 18 g of gallium oxide ($Ga_2O_3$, 3N); and 4.2 g of aluminum oxide ($Al_2O_3$, 3N), were laid. The crucible was set at a predetermined position in a precision vertical tubular electric furnace, and was heated at 1000° C. to melt the mixture. The melt mixture was fully stirred to be evenly mixed, and then cooled down to the melt temperature of 775° C. to obtain a melt for raising a bismuth-substituted iron garnet single crystal. By a conventional procedure, the surface of thus obtained melt was made in contact with the one surface of a (111) garnet single-crystal substrate: $(GdCa)_3(GaMgZr)_5O_{12}$ (lattice constant: 12.493±0.002 Å) of 480 μm in thickness, and the epitaxial growth was continued while maintaining the melt temperature of 775° C. to obtain a $(HoTbBi)_3(FeGaAl)_5O_{12}$ single-crystal film (HoTbBiFeGaAlG single-crystal film) of 47 μm in film thickness. Then, the HoTbBiFeGaAlG single-crystal film was cut into the size of 1 mm×3 mm to be measured with respect to magnetic characteristics. The measurement was carried out as the following. First, the HoTbBiFeGaAlG single-crystal film of 1 mm×3 mm in size was positioned at the center of a magnet field generating device (MAGNET) comprising of a coil produced by MAGNATEC Co., and then, as a magnet field being applied, a semiconductor laser beam of 0.786 μm was emitted to the HoTbBiFeGaAlG single-crystal film. And, by measuring the rotation angle of the polarization plane in the laser ray passed through the HoTbBiFeGaAlG single-crystal film, the applied magnetic field-dependent characteristics of the Faraday rotation angle was studied.

Figure 4:
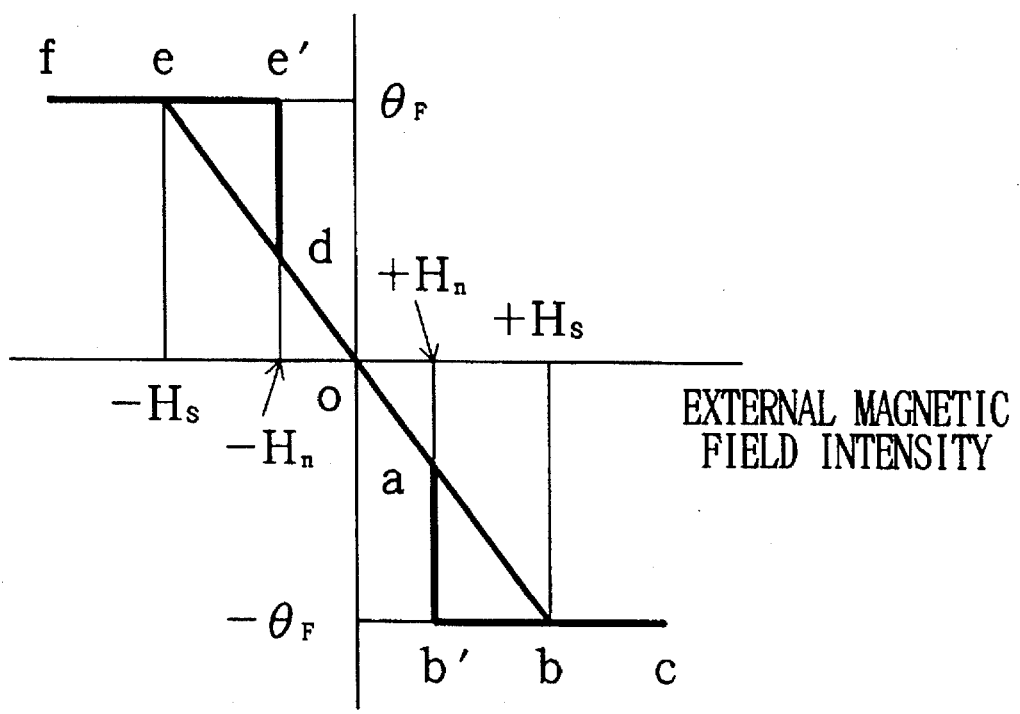
FIG. 4 is a schematic drawing to show an example of magnetic characteristics with respect to a rare-earth iron garnet single crystal with magnetic hysteresis.
Figure 5:
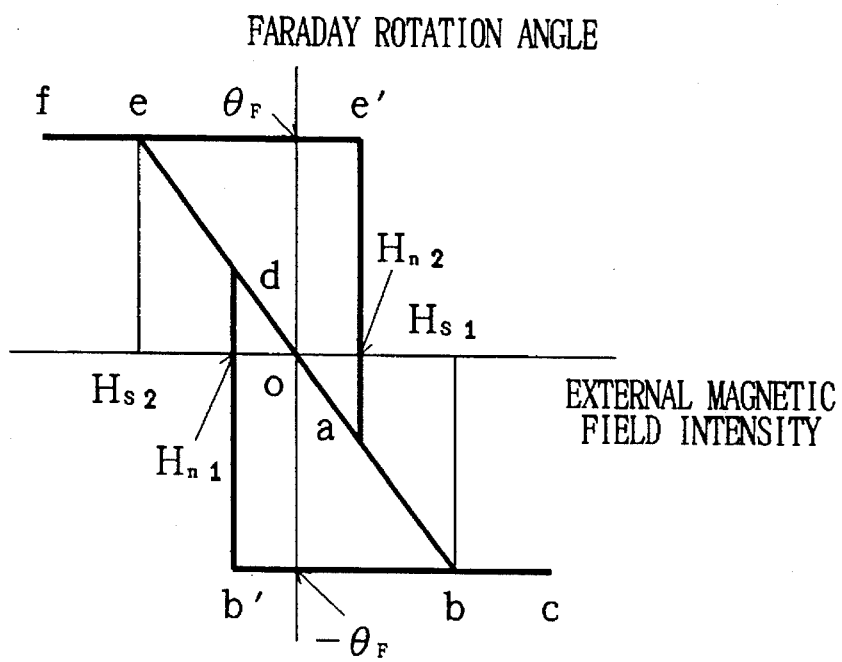
FIG. 5 is a schematic drawing to show an example of magnetic characteristics with respect to a rare-earth iron garnet single crystal with extremely large magnetic hysteresis.

As the result, with respect to the HoTbBiFeGaAlG single-crystal film, the saturated magnetic field intensity and the hysteresis value were known; the hysteresis curve similar to FIG. 4 was obtained. That is, the magnetic characteristics of the HoTbBiFeGaAlG single-crystal film was the following:

$$Hs1=180(Oe)Hs2=-180(Oe)Hn1=20(Oe)Hn2=-20(Oe)$$

Figure 10:
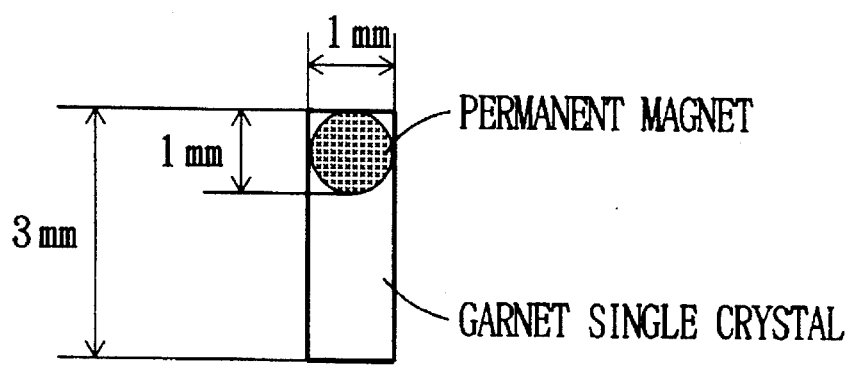
FIG. 10 is a schematic drawing to show a Faraday rotator, whereof a permanent magnet is positioned on a part of a rare-earth iron garnet single crystal of 1 mm×3 mm in size.
Figure 11:
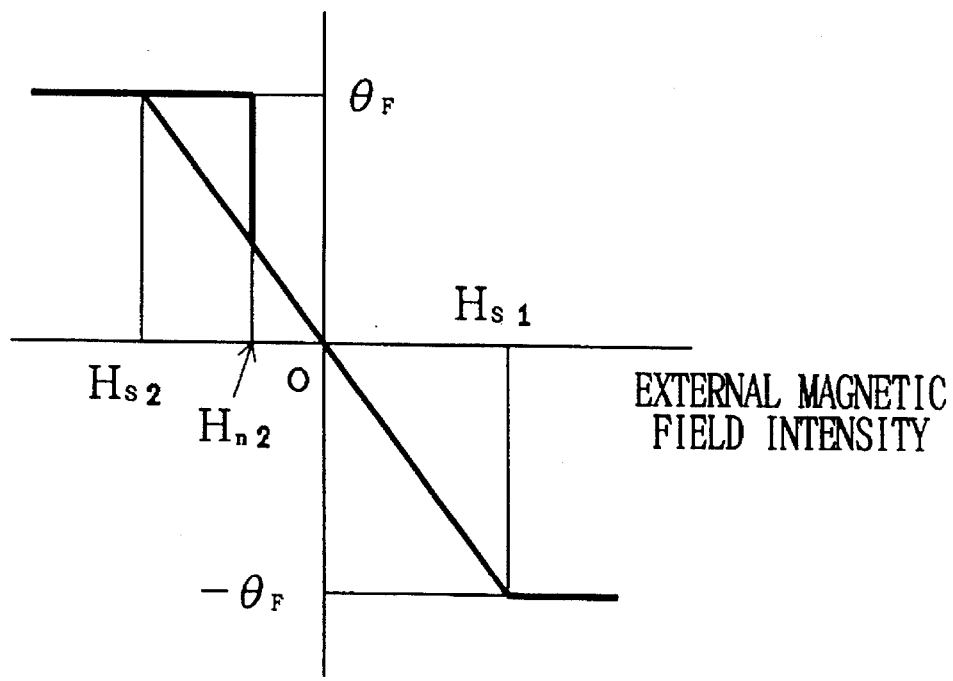
FIG. 11 is a drawing to show an example of magnetic characteristics with respect to a rare-earth iron garnet single crystal comprising of the components in FIG. 10.

Secondly, a permanent magnet being positioned and fixed on the HoTbBiFeGaAlG single-crystal film as shown in FIG. 10, the magnetic characteristics was measured similarly. The permanent magnet was a ferrite permanent magnet of 4000(G) residual magnetic flux density and 1 mmφ×1 mm in size. The ferrite permanent magnet was fixed on the corner of the Faraday rotator by an epoxy adhesive, wherein the magnetization direction being normal to the film surface of the Faraday rotator. The measured values of magnetic characteristics at the center of the Faraday rotator are shown in FIG. 11. The magnetic hysteresis was eliminated in the plus zone (opposite direction to the magnetization direction by the permanent magnet) with respect to the applied magnetic field. That is, the magnetic characteristics of the HoTbBiFeGaAlG single-crystal film were the followings:

$$Hs1=180(Oe)Hs2=-180(Oe)Hn1=180(Oe)Hn2=-10(Oe)$$

Embodiment 2

Figure 12:
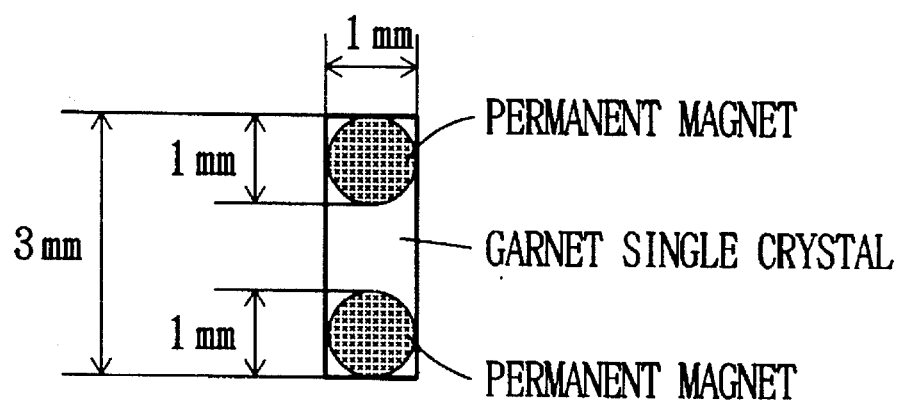
FIG. 12 is a schematic drawing to show a Faraday rotator, wherein a couple of permanent magnets are positioned on parts of a rare-earth iron garnet single crystal of 1 mm×3 mm in size.

Except that the ferrite permanent magnet used in Embodiment 1 was positioned as shown in FIG. 12, the magnetic characteristics of the HoTbBiFeGaAlG single-crystal film was measured in the same method as Embodiment 1. However, the two ferrite permanent magnets were positioned adversely to each other in their magnetization direction. The magnetic field characteristics measured at the center of the Faraday rotator showed the characteristics described in FIG. 1. That is, their values were as follows:

$$Hs1=180(Oe) Hs2=-180(Oe) Hn1=180(Oe) Hn2=-180(Oe)$$

Embodiment 3

Except that the rare-earth element-permanent magnet of 10000(G) residual magnetic flux density and 1 mm$\phi$×1 mm in size was used instead of the ferrite permanent magnet in Embodiment 2, the measurement was carried out in the same method as Embodiment 2. The magnetic field characteristics measured at the center of the HoTbBiFeGaAlG single-crystal film showed the characteristics described in FIG. 1. That is, their values were as follows:

$$Hs1=180(Oe) Hs2=-180(Oe) Hn1=180(Oe) Hn2=-180(Oe)$$

Embodiment 4

Figure 13:
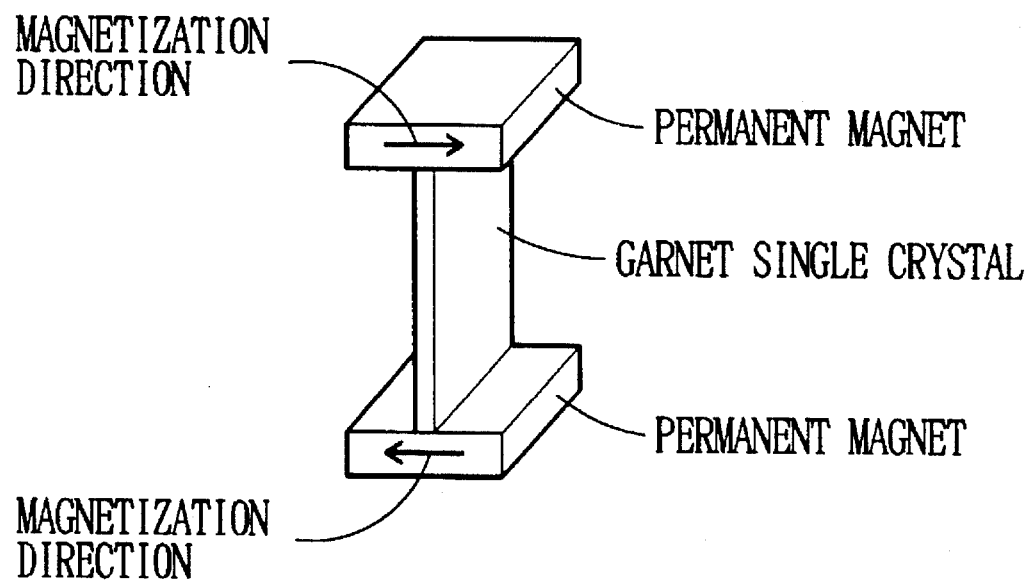
FIG. 13 is a schematic drawing to show a Faraday rotator, wherein a couple of permanent magnets are positioned on both ends of a rare-earth iron garnet single crystal of 1 mm×3 mm in size.

Ferrite permanent magnets of 4000(G) residual magnetic flux density and 1 mm×1 mm×0.5 mm in size was fixed by an epoxy adhesive on the both ends of the HoTbBiFeGaAlG single-crystal film of 1 mm×3 mm in size produced in Embodiment 1. The arrangement of the HoTbBiFeGaAlG single-crystal film and the magnet is shown in FIG. 13. The ferrite magnet was positioned such that the magnetization direction is normal to the film surface of the HoTbBiFeGaAlG single-crystal film. The measuring values of the magnetic characteristics at the center of the HoTbBiFeGaAlG single-crystal film are shown in FIG. 12. That is, their values were as follows:

$$Hs1=180(Oe) Hs2=-180(Oe) Hn1=180(Oe) Hn2=-180(Oe)$$

Embodiment 5

In a platinum crucible of volume 300 ml, the materials, 420 g of lead oxide (PbO, 4N); 490 g of bismuth oxide ($Bi_2O_3$, 4N); 65 g of ferric oxide ($Fe_2O_3$, 4N); 15 g of boron oxide ($B_2O_3$, 5N); 7.1 g of gadolimium oxide ($Gd_2O_3$, 3N); 1.3 g of gallium oxide ($Ga_2O_3$, 3N); and 3.8 g of aluminum oxide ($Al_2O_3$, 3N), were laid. The crucible was set at a predetermined position in a precision vertical tubular electric furnace, and was heated at 1000° C. to melt the mixture. The melt mixture was fully stirred to be evenly mixed, and then cooled down to the melt temperature of 841° C. to obtain a melt for raising a bismuth-substituted magnetic garnet single crystal. By a conventional procedure, the surface of thus obtained melt was made in contact with the one surface of a (111) garnet single-crystal substrate: $(GdCa)_3(GaMgZr)_5O_{12}$ (lattice constant: 12.493±0.002 Å) of 480 μm in thickness, and the epitaxial growth was continued while maintaining the melt temperature of 841° C. The epitaxial growth brought out a $(GdBi)_3(FeGaAl)_5O_{12}$ single-crystal film (GdBiFeGaAlG single-crystal film) of 26 μm in film thickness.

Figure 6:
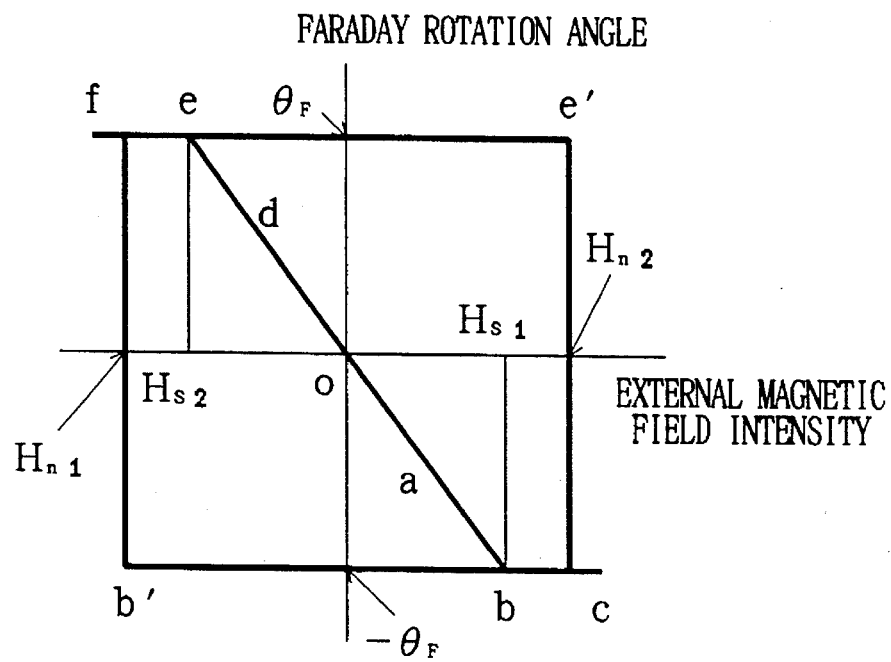
FIG. 6 is a schematic drawing to show an example of magnetic characteristics with respect to a rare-earth iron garnet single crystal with such extremely large magnetic hysteresis that is of a rectangular hysteresis route.
Figure 7:
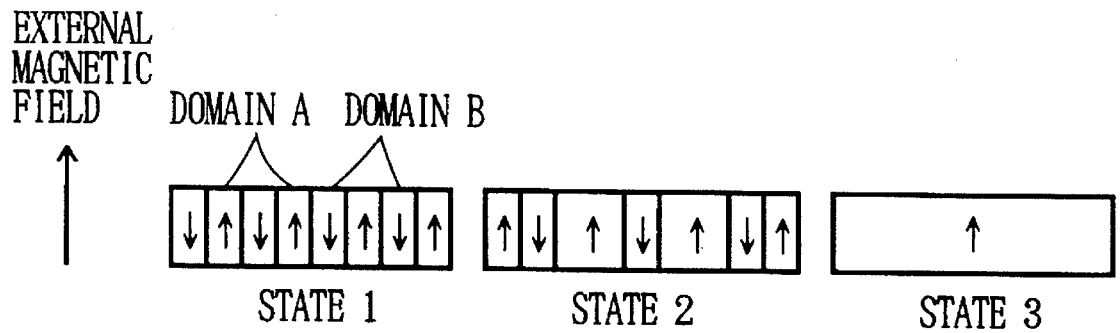
FIG. 7 is a schematic drawing to show a state of magnetic domains with respect to a rare-earth iron garnet single crystal.
Figure 8:
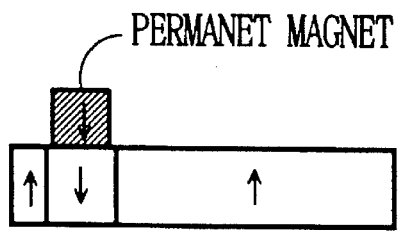
FIG. 8 is a schematic drawing to show a state of magnetic domains with respect to a rare-earth iron garnet single crystal, whereof a permanent magnet is positioned on a part of a rare-earth iron garnet single crystal and a magnetic field is applied to the crystal, the magnetic field having an intensity larger than the saturated magnetic field intensity from outside.
Figure 9:
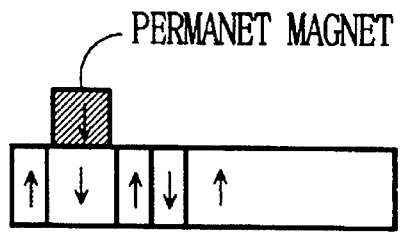
FIG. 9 is a schematic drawing to show a state of magnetic domains with respect to a rare-earth iron garnet single crystal, whereof a permanent magnet is positioned on a part of a rare-earth iron garnet single crystal and the crystal is applied the magnetic field having the intensity less than the saturated magnetic field intensity from outside.

Then, the GdBiFeGaAlG single-crystal film was cut into the size of 1 mm×3 mm to be measured with respect to the magnetic characteristics; the magnetic characteristics was measured by the just same method as Embodiment 1 and showed the rectangular hysteresis described in FIG. 6. That is, their values are as follows:

$$Hs1=80(Oe) Hs2=-80(Oe) Hn1=-240(Oe) Hn2=240(Oe)$$

Figure 1:
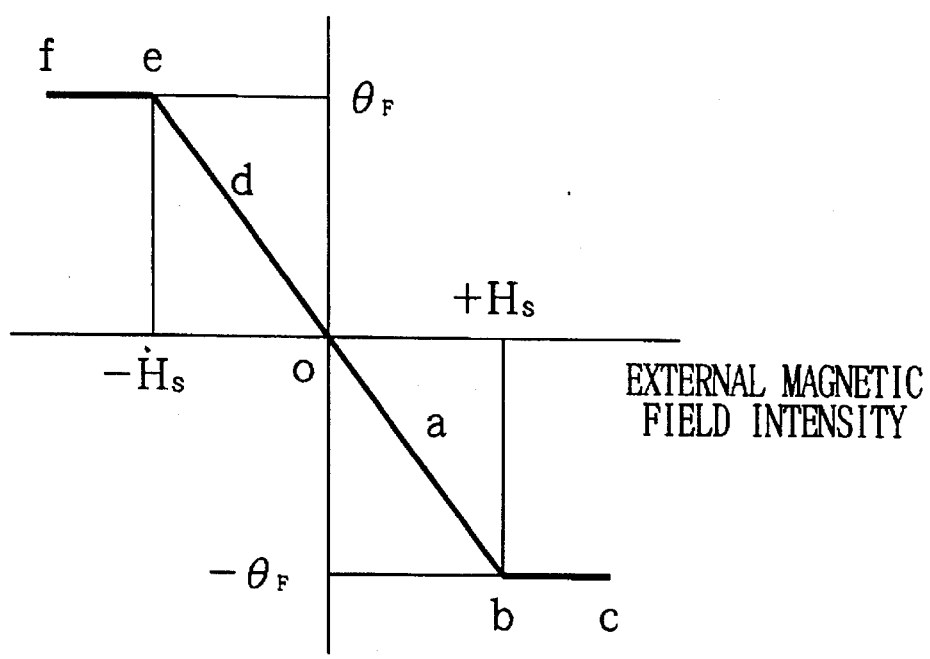
FIG. 1 is a schematic drawing to show an example of magnetic characteristics with respect to a rare-earth iron garnet single crystal with no magnetic hysteresis.
Figure 2:
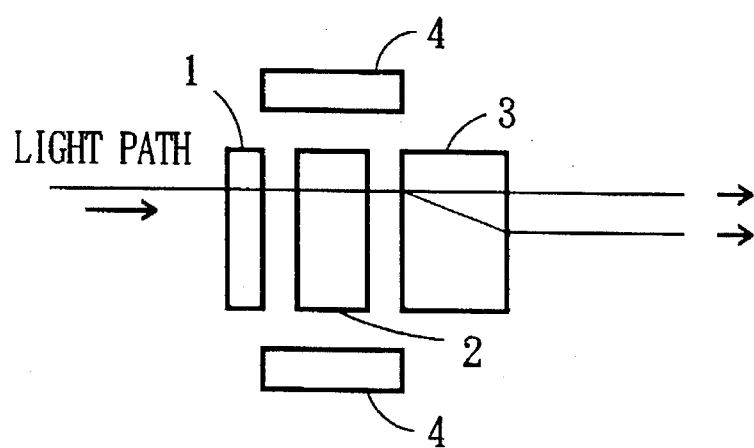
FIG. 2 is a drawing to illustrate an example of optical switches utilizing Faraday effect.
Figure 3:
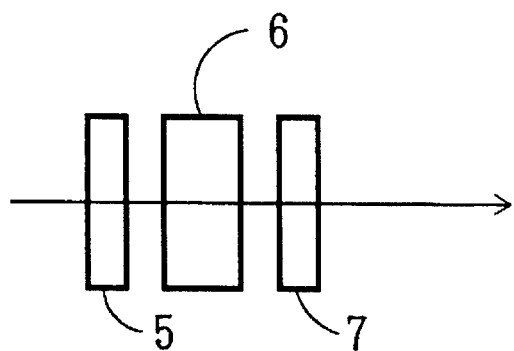
FIG. 3 is a drawing to illustrate an example of current sensors utilizing Faraday effect.

Secondly, a permanent magnet was fixed on the GdBiFeGaAlG single-crystal film of 1 mm×3 mm in size, positioned as shown in FIG. 13, in the same method as Embodiment 4, the magnetic characteristics were measured similarly. The permanent magnet was the same ferrite permanent magnet as used in Embodiment 4, of 4000(G) residual magnetic flux density and 1 mm×1 mm×0.5 mm in size. The measured values of the magnetic characteristics at the center of the GdBiFeGaAlG single-crystal film are shown in FIG. 1. That is, their values were as follows:

$$Hs1=80(Oe) Hs2=-80(Oe) Hn1=80(Oe) Hn2=-80(Oe$$

According to the p resent invention, the magnetic hysteresis can be erased with respect to a rare-earth iron garnet single-crystal film with large magnetic hysteresis which is an obstacle in using as a Faraday rotator although the film has an extremely small saturated magnetic field intensity. As the result, an optical switch utilizing Faraday effect and a magneto-optical sensor with a Faraday rotator, wherein being applied a rare-earth iron garnet single-crystal film with a small saturated magnetic field intensity, have been enabled.

What is claimed is:

1. A Faraday rotator comprising:
   a rare-earth iron garnet single-crystal film having a film surface; and
   first means for reducing hysteresis in first curve direction in a magnetization curve of said film by constantly magnetizing a first part of said film in a first direction normal to said film surface, said first part being less than all of said film.

2. A Faraday rotator as claimed in claim 1 wherein said first means comprises a permanent magnet arranged to magnetize said first part.

3. A Faraday rotator as claimed in claim 1 further comprising second means for reducing hysteresis in second curve direction in a magnetization curve of said film by constantly magnetizing a second part of said film different from said first part in a second direction normal to said film surface and opposite to said first direction, said second part being less than all of said film.

4. A Faraday rotator as claimed in claim 3 wherein said second means comprises a permanent magnet arranged to magnetize said second part.

5. A Faraday rotator comprising:
   a rare-earth iron garnet single-crystal film having a film surface; and
   a first permanent magnet arranged to constantly magnetize only a first part of said film in a first direction normal to said film surface, said first part being less than all of said film.

6. A Faraday rotator as claimed in claim 5 further comprising a second permanent magnet arranged to constantly magnetize only a second part of said film in a second direction normal to said film surface, said second part being different from said first part and less than all of said film, and said second direction being opposite to said first direction.

* * * * *